Aug. 18, 1959     E. C. SCOTT     2,900,256
METHOD AND APPARATUS FOR PRODUCING GRANULATED FOOD PRODUCTS
Filed June 25, 1956
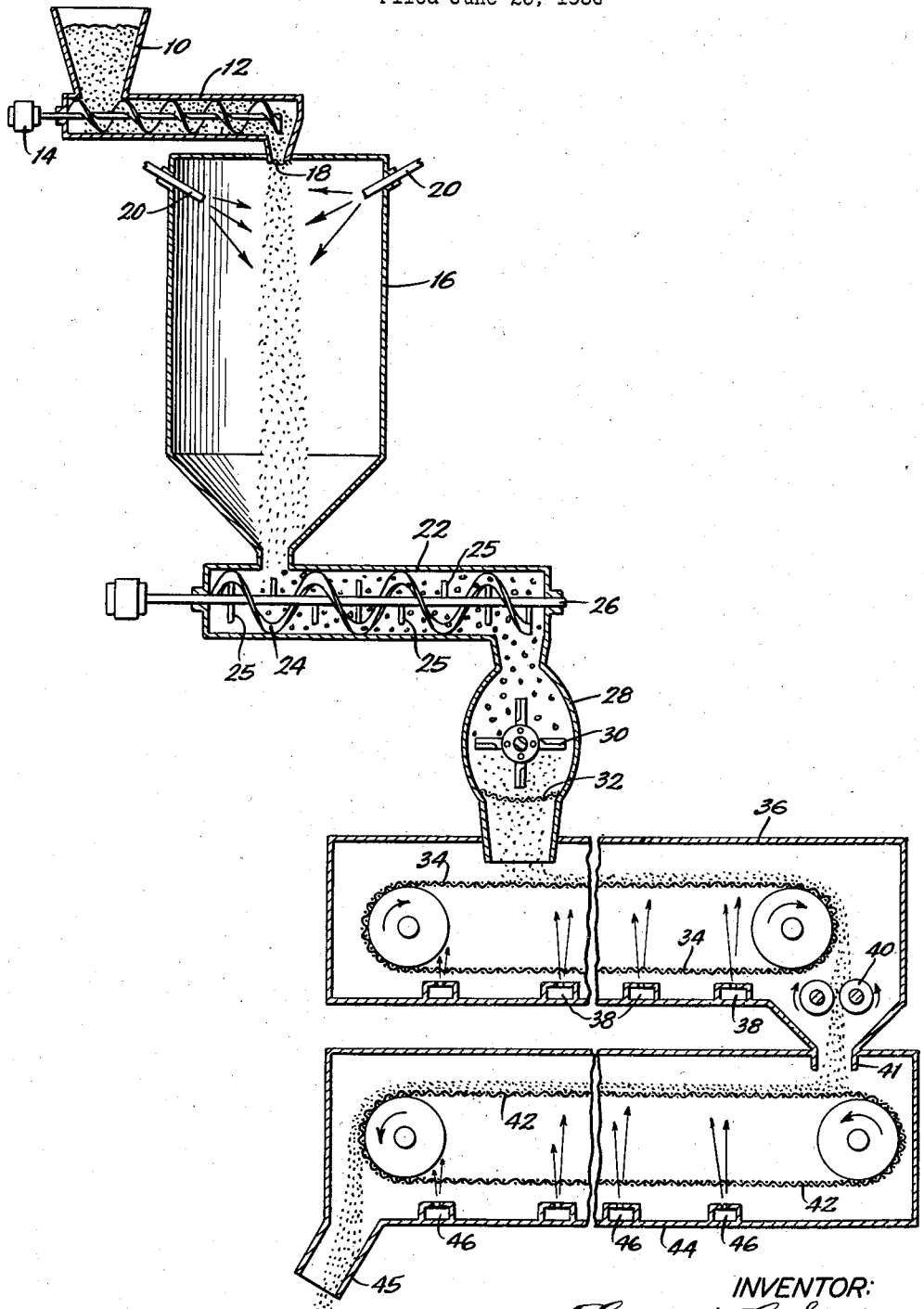
INVENTOR:
Everette C. Scott,
BY Bair, Freeman & Molinare
ATTORNEYS.

United States Patent Office 2,900,256
Patented Aug. 18, 1959

2,900,256

METHOD AND APPARATUS FOR PRODUCING GRANULATED FOOD PRODUCTS

Everette C. Scott, Brookfield, Ill.

Application June 25, 1956, Serial No. 593,578

13 Claims. (Cl. 99—56)

This invention relates to a method and apparatus for increasing the water solubility of dried powders and more particularly to increasing the solubility of finely divided dried food products so that they may be readily dissolved for use. Such products include skim milk powder, whole milk powder, powdered egg white, whole egg, egg yolk, and selected organic and inorganic chemicals. The process is especially suitable for treating protein-containing powdered materials.

Food products of many types have heretofore been spray dried for storage and handling in dry powder form. To convert such materials to their original liquid form, it is necessary only to add water. It has been found, however, that in many cases it is difficult to redissolve the powders because in the fine dry condition they tend to clump when water is added thereto and require vigorous stirring or agitation over an appreciable period of time to bring them back into solution.

The present invention has for its principal object a method of and apparatus for treating dried powders to increase their solubility and decrease their hygroscopicity.

Another object of the invention is to provide a method and apparatus by which dried powders may be collected in loose clusters or agglomerates which will accept liquid readily for easy and rapid solubility.

Still another object is to provide a method and apparatus by which dried powders are wetted, collected into clusters and then dried to form a readily soluble powder product.

According to one feature, the dried powder is uniformly sprayed with liquid which may be the original liquid product, a concentrate thereof, water, or any desired solubilizing solution, such as one with desired adhesive or antioxidative properties, to make the surface of the powder particles wet and thereby adhesive. Thorough mixing of the wetted powder is effected. The adhesive particles then may be agglomerated into clusters by impacting and the size of the clusters is preferably controlled by screening. The clusters may thereafter be dried by subjecting them to a current of heated air.

The above and other objects and features of the invention will be more readily understood from the following detailed description of one method of practicing the invention and one form of apparatus for carrying out the method.

The invention consists in the novel manner in which the wetted milk powder is agglomerated into clusters or granules of desired density. The surface of the powdered particles first must be properly conditioned to promote adhering one with the other and then the particles must be bombarded or subjected to high velocity impact to produce collisions one with the other to cause them to adhere or agglomerate. The impact-producing means preferably is capable of producing varying impact forces to facilitate handling particles having different degrees of adhesiveness; for example, particles containing protein and sugar adhere much more readily and with less concussion and impact than do particles containing considerable fat. Organic and inorganic salts differ greatly as to the amount of concussion required to promote adhesion.

To produce agglomerates of the desired density it is essential that the moisture added to the powdered particles be carefully controlled. Skim milk powder, which has great affinity for water, is difficult to wet uniformly, while whole milk powder, a fat bearing material, is quite uniformly surface wetted by spraying. Uniform wetting is essential to the production of uniform agglomerates under impact. Using skim milk powder as an example, fine dense agglomerates or clusters are produced if the moisture is added in the range of 7–8% and the product is subjected to impact quickly after wetting. The dense small particles so produced can be rewetted, as for example when the milk is being reconstituted, only by pouring water on the dry material before stirring. These dense particles also retain all of the normal hygroscopic characteristics of regular skim milk powder. These dense small agglomerates may or may not be desired in a skim milk solid, although such agglomerates may be highly desirable for products other than milk.

A very desirable product of relatively low density (as compared with original powder) and having a porous or sponge-like consistency, which is readily solubilized when poured into water, may be made in accordance with this invention. For purposes of illustration, the starting material may be ordinary dried milk powder derived from previous desiccation. The production of a relatively low density, spongy skim milk product requires uniform wetting to the extent of 10–14% by weight, and allowing the wetted protein to swell and the milk sugar to hydrate and absorb its water of crystallization requirements, thereby expanding the individual particles of powder. Preferably, the milk powder is gravity fed at a uniform rate between two fan-shaped sprays of liquid, for example, water or skim milk. The liquid may be maintained at a temperature of about 160° F. Condensed milk at this temperature has proved to be an excellent wetting agent. It promotes good cohesion and also provides additional solids and increased yield. Spray nozzles are disposed to emit a fine spray of the hot liquid downwardly in the direction of the falling airborne powder. If the spray were directed upwardly, the flow path of the particles would become distorted, and some particles would be hit repeatedly by the spray. It is preferable that the wetting be as uniform as possible.

Before the wetted material is subjected to impact to produce agglomerated clusters, it is desirable to permit the liquid to penetrate through the powder particles to completely hydrate the same. This may be accomplished by permitting a short time, say 15 to 20 seconds, to elapse between the spray step and the impacting step. Preferably during this time period the wetted mass is subjected to vigorous agitation to promote thorough mixing and uniform distribution of the moisture. I have found that a ribbon mixer equipped with prongs serves well for this purpose. The spongy mass discharged from the ribbon mixer may contain some rather large sized chunks. The material is then introduced into a hammer mill operating at high speed in which the rotating blades break up the chunks and simultaneously effect the necessary concussion or impact to agglomerate the particles into clusters or granules of the desired size. The size of the clusters is controlled by the degree of wetting, as previously indicated, the speed of the blades in the mill, the taper of the blades and the size of the screen in the discharge duct of the mill. The tapered or angularly disposed mill blades strike the particles tangentially and cause them to collide repeatedly with each other. A flat or square blade tends to carry the particles directly through the mill, which minimizes the opportunity for agglomeration.

The clusters must then be dried without causing disintegration or further agglomeration. The preferred method for drying is by depositing the clusters on a porous conveyor belt in a uniform layer and advancing the layer through an oven in which hot air at about 160° to 240° F. is circulated upwardly through the material. Other suitable means for drying may also be employed; for example, the clusters may be dropped into a countercurrent stream of hot air which is moving at a rate sufficient to buoy the clusters so that they fall slowly to the bottom of the vessel. Drying is effected during the period of descent. Drying time is approximately 30 seconds. The clusters may be sized by passing them between slightly spaced rolls and then cooled to about 80° F. Cooling may be carried out by advancing the clusters on a porous belt through an enclosed space through which cold air is circulated upwardly through the belt, or by other suitable means. Fines may be removed by screening.

The resultant product consists of relatively coarse, porous clusters of convenient size for handling. They are readily wettable by water so that they dissolve easily and quickly and do not pack in the same manner as fine powders when they are mixed with water. The clusters or agglomerates formed by the present invention can, therefore, be mixed into a liquid and dissolved very quickly with a minimum of agitation; they are readily flowable in dry form and will not cake in storage, even though they are readily water soluble.

Reference is now made to the drawing which illustrates semi-diagrammatically my novel apparatus for practicing the process just described in a continuous manner. Dried milk powder, or other dried material which is to be formed into clusters in accordance with the invention, is charged into the hopper 10. A screw conveyor 12 driven by a motor 14 connects to the bottom discharge opening in the hopper 10 and serves to convey powdered material at a uniform rate from the hopper into the cylindrical hydration vessel 16 through a screen 18 in the outlet opening leading from the screw conveyor. Mounted at diametrically opposite points in the wall of the hydration vessel 16 are nozzles 20 through which wetting liquid is directed downwardly in the form of a fine fan-shaped spray. Powder passing through the screen 18 is subjected to the fan-shaped spray patterns of liquid emitted from the nozzles. The wetted particles fall to the bottom of the vessel 16 and are discharged into a ribbon mixer 22. The ribbon mixer has thin spiral tape 24 and a series of radial prongs 25 disposed around a central shaft 26. The shaft is driven so that wetted material entering the mixer 22 becomes thoroughly agitated as it is advanced to the end of the mixer from which it is discharged into the hammer mill 28. The tapered rotor blades 30 within the hammer mill rotate at a relatively high speed (1700–2300 r.p.m.) and cause the particles to be subjected to concussion and impact which brings about formation of the clusters by agglomeration. The agglomerated clusters pass through the screen 32 in the bottom of the mill, which serves to provide control over the size of the clusters. The clusters fall from the mill 28 onto the conveyor 34 which has a porous belt for supporting the clusters. The clusters are carried by the conveyor 34 through the oven 36 in which hot air rises from the air inlets 38 through the clusters on the belt. The dried clusters discharged from the end of the conveyor 34 pass through a pair of sizing rolls 40 which are spaced so as to break up any clusters that may have bunched together during the drying step. To decrease the length of the oven, several belts may be disposed, one above the other, within the oven to carry the clusters back and forth until sufficient time has elapsed to complete the drying operation. From the sizing rolls the sized clusters drop through chute 41 to another conveyor 42 within cooling zone 44 supplied with cold air through ducts 46. The finished product is discharged from the left end of the conveyor 42 through chute 45.

A pilot plant model built in accordance with the drawing was operated in the production of milk agglomerates from dried skim milk powder. The hopper 10 was adapted to hold about 20 pounds of skim milk powder. The powder was continuously and uniformly discharged through the 14-mesh screen 18, which was about ¾ inch wide and 6 inches long. The screen insures discharge into the vessel 16 continuously and at a uniform rate. Skim milk at 160° F. was introduced through the nozzles 20. The powder flowing through the hydration vessel 16 was delivered at the rate of 395 pounds per hour and sufficient milk was introduced through the nozzles to effect 12% wetting (60 pounds per hour of 9% skim milk). The wetted powder was advanced through the ribbon mixer which was operated at a speed of about 75 r.p.m. The time elapsing did not exceed about 10 seconds. The hammer mill 28 was equipped with a bevelled blade rotor and operated at 2200 r.p.m. using a ½ inch perforated screen 32. The resultant product had the properties described above.

In a modified form, a conveyor belt may be disposed between the hydration vessel and the hammer mill to supplement the ribbon mixer, the object being to lengthen the time for hydration of the particles by the liquid prior to the agglomerating step.

While the invention has been particularly described in connection with food materials, it will be understood that it may be used equally well with many other types of materials and it is not intended to limit the scope of the invention to the exact materials, exact method steps or exact apparatus specifically disclosed nor otherwise than by the terms of the appended claims.

What I claim as new and desire to secure by Letters Patent of the United States is:

1. A process for producing readily soluble granules or clusters from solid powdered material which comprises adding moisture to the particles of said powdered material to produce a homogeneous mixture of adhesive particles and agglomerating said particles into clusters by subjecting said particles to repeated high velocity impact with each other, said clusters being of larger size and lesser density than the powder particles from which they are formed.

2. The process for producing readily soluble milk granules or clusters from dried milk powder which comprises adding moisture to the milk powder particles to produce a homogeneous mixture of adhesive particles, and agglomerating said particles into clusters by subjecting said particles to repeated high velocity impact with each other, said clusters being of larger size and lesser density than the powder particles from which they are formed.

3. A process for producing readily soluble milk granules or clusters from dried milk powder which comprises passing a continuous stream of milk powder particles through a liquid spray to render the particles adhesive, permitting the liquid to become absorbed by the particles, and agglomerating said particles while moist and adhesive into clusters of relatively low density by causing them repeatedly to collide with each other at high velocity in a hammer mill.

4. The process of claim 3 wherein the liquid is applied in quantities ranging from 10–14% by weight based on the dry particles.

5. The process of claim 4 wherein said liquid is maintained at a temperature of about 160° F.

6. The process of claim 4 wherein said liquid is condensed milk.

7. A process for producing readily soluble milk granules or clusters from dried milk powder which comprises passing a continuous stream of milk powder particles through a liquid spray to render the particles adhesive, vigorously agitating the sprayed particles to provide a homogeneous mixture, and agglomerating said particles while moist and adhesive into clusters of relatively low density by causing them repeatedly to collide with each other at high velocity in a hammer mill.

8. A continuous process for producing readily soluble milk granules or clusters from dried milk powder which comprises advancing the milk powder by gravity through a spray of liquid to wet the particles and render them adhesive, conveying the wetted particles to a hammer mill while permitting the liquid to become absorbed by the powder, agglomerating said particles into clusters of relatively low density by causing them repeatedly to collide with each other at high velocity in said hammer mill, and passing the clusters through a drier.

9. Apparatus for producing agglomerated clusters, from dried powdered material, which comprises means for feeding powder at a uniform rate into a hydration vessel, nozzles disposed within said vessel for spraying liquid on said particles, a conduit to receive the wetted material from said vessel and a hammer mill connected to the discharge end of said conduit, said mill having a high speed rotor for agglomerating at high impact said wetted particles.

10. Apparatus of claim 9 wherein said nozzles are directed downwardly in the direction of flow of powder.

11. Apparatus for producing agglomerated clusters, from dried powdered material, which comprises means for feeding powder at a uniform rate into a hydration vessel, nozzles disposed within said vessel for spraying liquid on said particles, a mixer connecting to said hydration vessel for vigorously mixing the moistened powder, a conduit to receive the hydrated material, a hammer mill connected to the discharge end of said conduit, said mill having a high speed rotor for agglomerating at high impact said hydrated material, and drying means communicating with the outlet of said hammer mill.

12. Apparatus for producing agglomerated clusters from dried powdered material which comprises means for feeding powder at a uniform rate into a hydration vessel, nozzles disposed within said vessel for spraying liquid on said particles, a hammer mill having a high speed rotor for agglomerating said particles by high impact collisions, conveyor means for advancing said particles from said hydration vessel to said hammer mill, and drying means for receiving hydrated agglomerated clusters from the outlet of said hammer mill.

13. Apparatus for producing agglomerated clusters from dried powdered material which comprises means for feeding powder at a uniform rate into a hydration vessel, nozzles disposed within said vessel for spraying liquid on said particles, conveyor means for advancing and vigorously agitating the wetted particles, a hammer mill connected to the discharge end of said conveyor means having a high speed rotor with tapered blades for agglomerating by high impact collisions the wetted particles into clusters, a drier connected to the outlet of said hammer mill, and means for sizing the agglomerated clusters.

References Cited in the file of this patent

UNITED STATES PATENTS

| | | |
|---|---|---|
| 2,016,592 | Chuck | Oct. 8, 1935 |
| 2,174,734 | Chuck | Oct. 3, 1939 |
| 2,386,052 | Lundgren | Oct. 2, 1945 |
| 2,832,686 | Louder et al. | Apr. 29, 1958 |
| 2,835,586 | Peebles | May 20, 1958 |